UNITED STATES PATENT OFFICE.

JOSEPH H. DAVIS, OF MORRISTOWN, NEW JERSEY.

IMPROVEMENT IN MANUFACTURING PIGMENTS FROM IRON ORE.

Specification forming part of Letters Patent No. 11,476, dated August 8, 1854.

*To all whom it may concern:*

Be it known that I, JOSEPH HENRY DAVIS, of Morristown, in the county of Morris and State of New Jersey, have invented or discovered certain new and useful improvements in forming the ores of iron into paint by a direct process and of different colors; and I do hereby declare the following to be a full, clear, and exact description thereof.

By taking a pulverized hematite ore or oxide of iron and placing it in a reverberatory frame or cylinder or their equivalent heated to about 1000° Fahrenheit, and when the ore is raised to that point of heat steam should be introduced. To produce steam sufficient for this purpose I take a quantity of water equal to the quantity of ore used, and as the steam is introduced it is decomposed, and the oxygen mingles with those portions of the ore which are not sufficiently charged with oxygen, by which the process is completed, and a red pigment resembling Venetian red, red ocher, or Spanish brown is produced. The powdered iron ore should be submitted to the heat and steam about thirty minutes, and kept stirring all the time in any convenient way.

To make freestone or umber colored pigments I select dark-colored portions of bog or hematite ore, and pulverize it as before. The shades I change by roasting, as before described.

For black paint I use the magnetic iron ores and roast as above for at least one hour. If the pigment is to be a slate color, I roast it less.

For yellow pigment I use the hematite and bog ores or oxides.

Having thus fully described my improved method of making pigments of different colors from iron ores, what I claim therein as new, and for which I desire to secure Letters Patent, is—

The process herein described for making said colored pigments by the steaming of said ores, in addition to the usual process of selecting, pulverizing, and heating the same, for the purpose of obtaining pigments.

JOSEPH H. DAVIS.

Witnesses:
WM. HOPKINS,
J. HATSELL.